United States Patent [19]

Sterling

[11] 3,958,688
[45] May 25, 1976

[54] CONTAINER TURNER
[75] Inventor: Walter S. Sterling, Quincy, Mass.
[73] Assignee: Pneumatic Scale Corporation, Quincy, Mass.
[22] Filed: Sept. 23, 1974
[21] Appl. No.: 508,397

[52] U.S. Cl. .............................. 198/249; 198/268; 198/283; 198/160
[51] Int. Cl.² ........................................ B65G 47/24
[58] Field of Search ................. 198/22 R, 22 B, 29, 198/34, 246, 262, 267, 268, 282–287, 160, 162, 165, 257, 261, 248, 249, 167

[56] References Cited
UNITED STATES PATENTS

| | | | |
|---|---|---|---|
| 2,859,858 | 11/1958 | Stover | 198/34 A |
| 3,012,650 | 12/1961 | Carter | 198/268 |
| 3,054,496 | 9/1962 | Carter | 198/34 A |
| 3,216,551 | 11/1965 | Peck | 198/262 |
| 3,432,023 | 3/1969 | Lucas | 198/282 |
| 3,493,096 | 2/1970 | Antoszewski et al. | 198/257 |
| 3,541,751 | 11/1970 | Quebe et al. | 198/257 |
| 3,543,680 | 12/1970 | Killen et al. | 198/162 |
| 3,580,380 | 5/1971 | Phillips | 198/261 |
| 3,619,977 | 11/1971 | Theys et al. | 198/282 |

Primary Examiner—Evon C. Blunk
Assistant Examiner—Joseph E. Valenza
Attorney, Agent, or Firm—Robert T. Gammons

[57] ABSTRACT

Container orienting apparatus wherein a conveyor moves containers standing upright thereon between a guide rail at one side and a screw at the other side which spaces the containers on the conveyor, there being gaps intermediate the ends of the guide rail and screw providing an open space wherein the containers may be rotated about their vertical axis, a conveyor supported above the container conveyor carrying pivot pins at a spacing corresponding to the spacing of the containers on the container conveyor for engagement with the tops of the containers as they travel along the space to hold the containers on the conveyor while being rotated, a ram located at the space for initiating rotation of the containers as they enter the space and guides for completing the rotation of the containers as they leave the space.

29 Claims, 6 Drawing Figures

CONTAINER TURNER

BACKGROUND OF INVENTION

Container orienting apparatus is old in the art, however, that shown herein is considered to provide a less complex and more reliable piece of equipment than has heretofore been provided for this purpose and especially for processing containers at a very rapid rate without damage thereto.

As herein illustrated the apparatus is designed to orient containers which have a longer dimension in one direction than in a direction at right angles thereto so that they have broad sides and narrow ends and comprises means for moving the containers standing upright along predetermined path which constrains the containers to move along in single file with their sides parallel to the direction of movement and their ends transverse thereto and at a predetermined place along said path means for rotating such of the containers as necessary to arrange all of the containers traveling along said path with corresponding sides facing in the same direction. The constraining means comprises a guide rail along one side of the path and a screw along the other side of the path which defines a narrow passage along which the containers move single file. The screw operates to advance the containers at a predetermined spacing. There are gaps in the guide rail and the screw at said predetermined place providing an open space within which the containers are free of constraint and the means for rotating the containers is located along this space for effecting rotation of the containers to reverse their positions and includes means for pivotally engaging the upper ends of the containers to prevent lateral displacement during their rotation. The means for advancing the containers is a conveyor having a horizontal run upon which the containers stand upright and above the container conveyor there is a second conveyor on which there are mounted pivot pins at a spacing corresponding to the spacing of the containers on the container conveyor which are moved into engagement with the upper ends of the containers as the latter approach the space and are moved out of engagement with the upper ends of the containers as the latter leave the space. The pivot pins operate to hold a container down on the container conveyor and prevent lateral movement while permitting rotation about their vertical axis and have pointed ends to facilitate entry into the open ends of the containers. The means for effecting rotation of the containers at the space comprise a ram at one side of the conveyor arranged to be moved in reciprocation transversely of the conveyor and by engagement with a portion of a container rearwardly of its axis of rotation to initiate rotation of the container to a position transversely of the conveyor in which a portion of the container forwardly of its axis of rotation is disposed in a position to be intercepted by the guide rail at the one side of the space as the container continues to move forwardly along the space. Engagement of the container forwardly of its axis of rotation with the gudie rail effects displacement about the axis of rotation to a position rearwardly of the axis of rotation and simultaneously moves the portion rearwardly of the axis of rotation forwardly thereof. An inclined guide is arranged at the opposite side of the conveyor in a position to receive the forwardly disposed trailing side of the container and rotate it into alignment with the center line of the path along which the container is traveling so that it re-enters the passage between the guide rail and the screw. There is control means including a sensing device in the form of a photoelectric scanner which by detecting a container approaching the space supplies air to an air cylinder for moving the ram transversely of the conveyor.

The invention will now be described in greater detail with reference to the accompanying drawings;

FIG. 5 is a fragmentary plan view at the region where rotation takes place showing the successive positions of the containers as they are rotated.

The apparatus of this invention is designed to receive containers randomly from a source of containers and to orient them about their vertical axis so that corresponding sides of all of the containers face in the same direction. As herein illustrated, the containers have a longer dimension in one direction than the direction at right angles thereto so that the opposite sides are wider than the opposite ends, however, it is to be understood that the apparatus is capable of processing containers of the kind wherein the sides and ends are of equal width. The containers shown for the purpose of illustration are of the type commonly referred to as flasks, FIG. 1, so that their long dimensions extend from end to end and their short dimension from side to side. Customarily distinctively different indicia are applied to the opposite sides of the containers and it is the purpose of this apparatus to orient the containers so that the indicia of a kind all face in the same direction.

The apparatus for effecting orientation of the containers is arranged to receive the containers without previous alignment so that some may have indicia of one kind at one side and some at the other side, advance the containers along a predetermined path and during such forward movement rotate the containers about their vertical axis to dispose corresponding indicia on successive containers on the same side, that is, all facing the same way.

Figure 4:
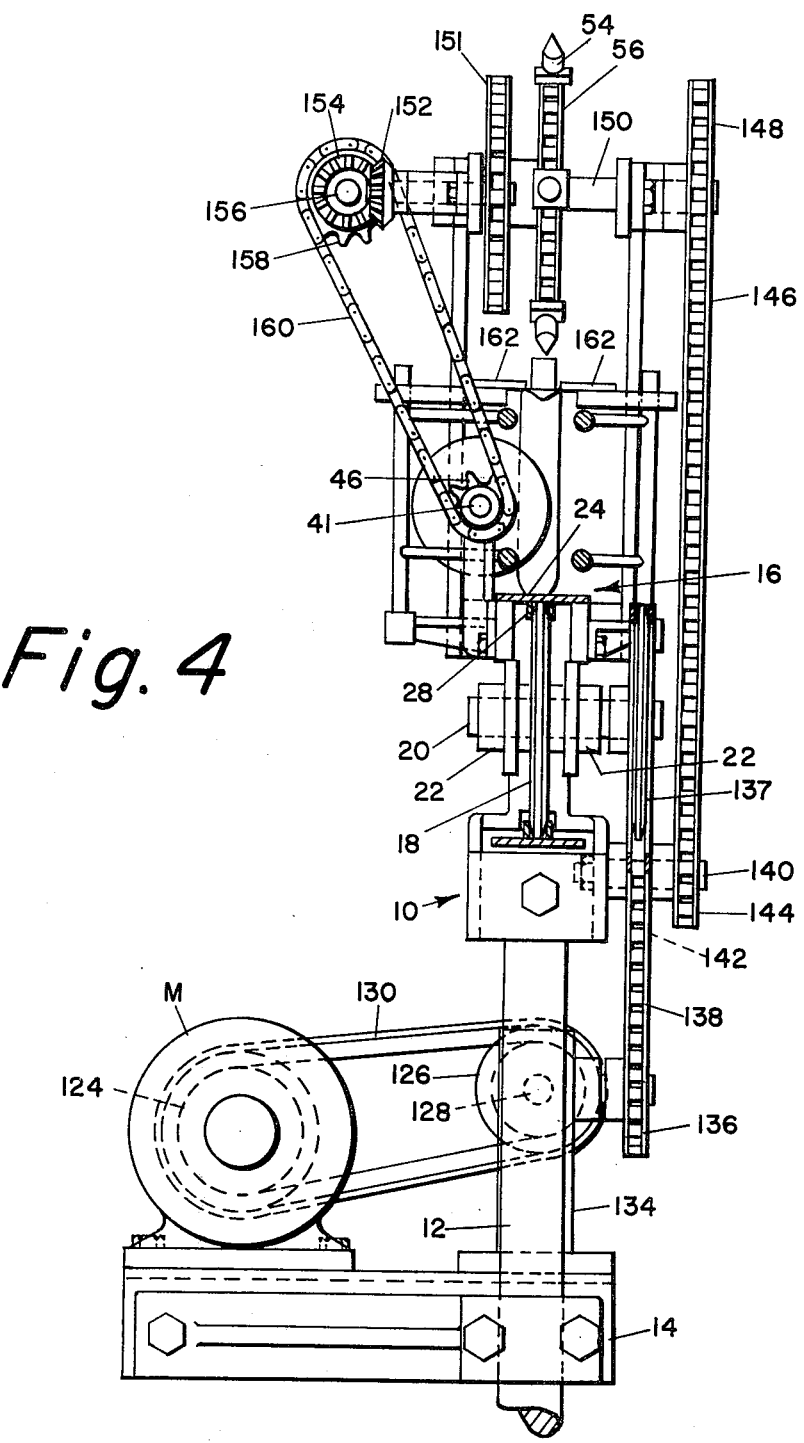
FIG. 4 is an elevation partly in vertical section taken on the line 4, 4 of FIG. 1.
Figure 6:
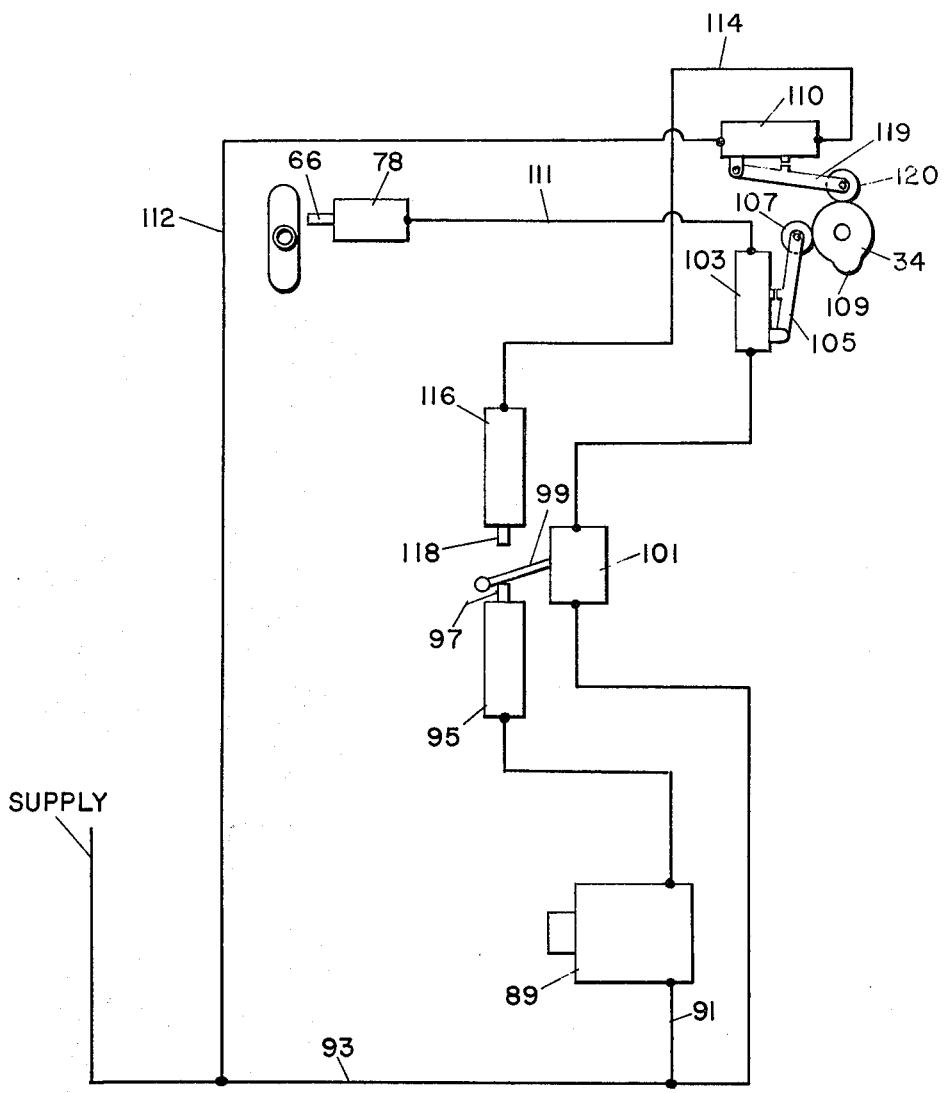
FIG. 6 is a diagram of the controls.

Referring to the drawings, the apparatus is provided with a supporting frame comprising an elongate beam 10 provided at its ends with posts 12 fixed at their lower ends to a base 14, FIG. 4, so as to be supported above and parallel to the floor. A conveyor 16 is mounted on the beam on longitudinally spaced sprockets 18—18 fixed to transversely dispose shafts 20—20 journaled at opposite sides of the sprockets in bearing members 22—22 secured to the beam. The shaft 20 at one end extends laterally from its bearing 22 as shown in FIG. 4. The conveyor is a flat belt provided at its inner side with tooth receiving pocket 28 for interengagement with the teeth of the sprockets 18 so that the belt is moved in translation without slip, has an upper horizontal run 24 which travels along the upper side of the beam and a lower run which travels along the underside of the beam in a supporting passage 30, FIG. 1.

The containers to be oriented are deposited on the upper horizontal run of the belt for movement along a predetermined path in single file and are confined and guided during such movement by means of a guide rail 32 at one side and a spacer screw 34 at the opposite side. The rail and screw in conjunction defining a narrow longitudinally extending passage 35 which compels the containers to move in single file and at a uniformly predetermined spacing determined by the pitch of the screw.

Figure 3:
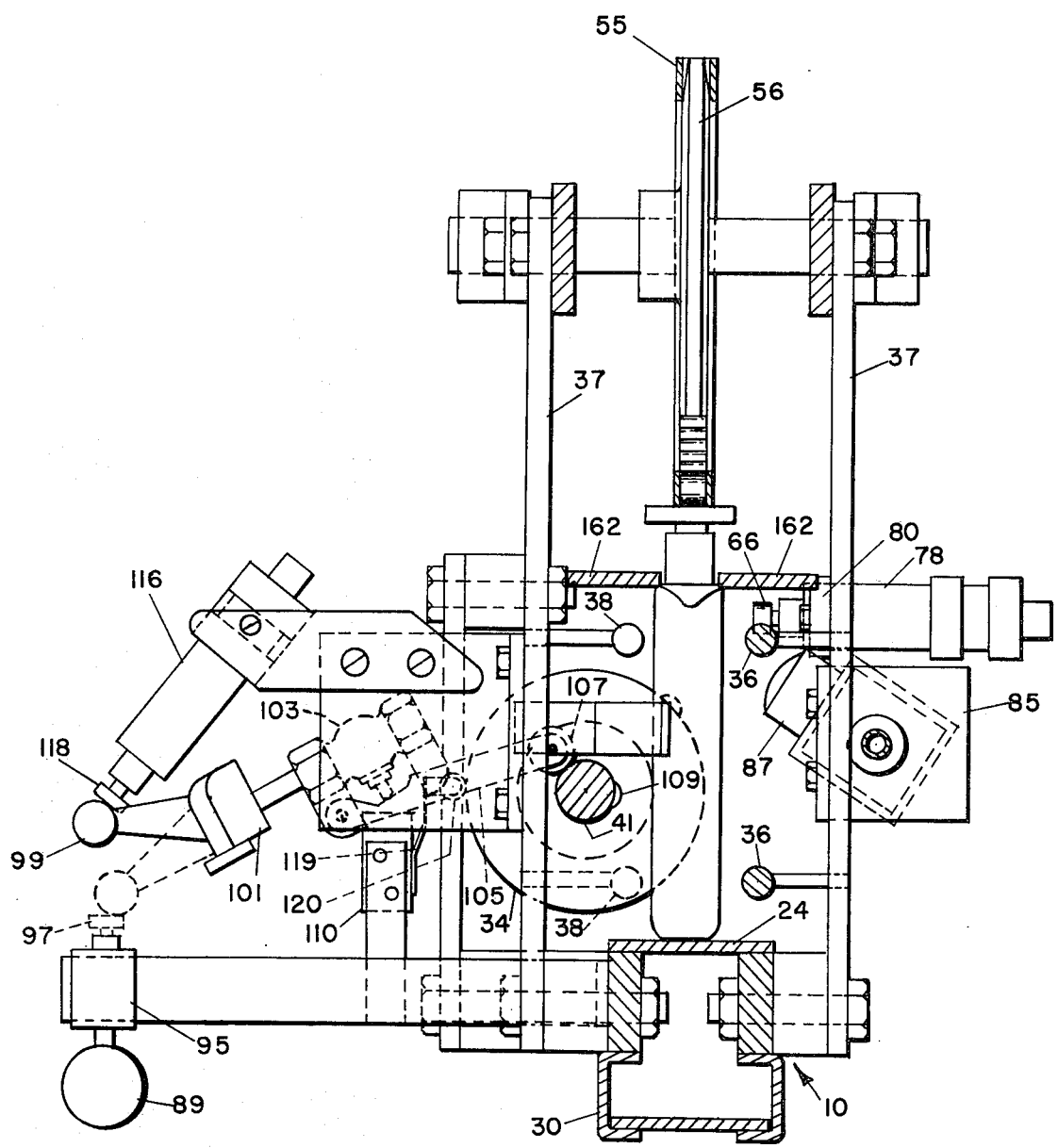
FIG. 3 is a vertical section taken on the line 3, 3 of FIG. 1.

The guide rail 32 comprises vertically spaced rods 36—36 which extend along one side of the horizontal run of the conveyor and are supported at suitable intervals on the machine frame by means of uprights 37 bolted to the sides of the beam. The screw 34 does not extend the full length of the apparatus and so there are mounted at the opposite ends of the screw and on the same side additional vertically spaced rods 38—38, FIG. 3, which guide the containers before they reach the screw and after they leave the screw.

The screw 34 has a helical thread 40 of a configuration to pocket a container placed between it and the guide rail 32 so as to advance the containers in uniformly spaced relation in consonance with the translational movement of the conveyor and is supported on a shaft 41 which in turn is supported at its opposite ends in suitable bearings 42—42 mounted on the frame by means of supporting brackets 44—44 for rotation about a longitudinal axis and there is provided at one end of the screw a sprocket 46 by means of which it is rotated as will appear hereinafter.

Figure 1:
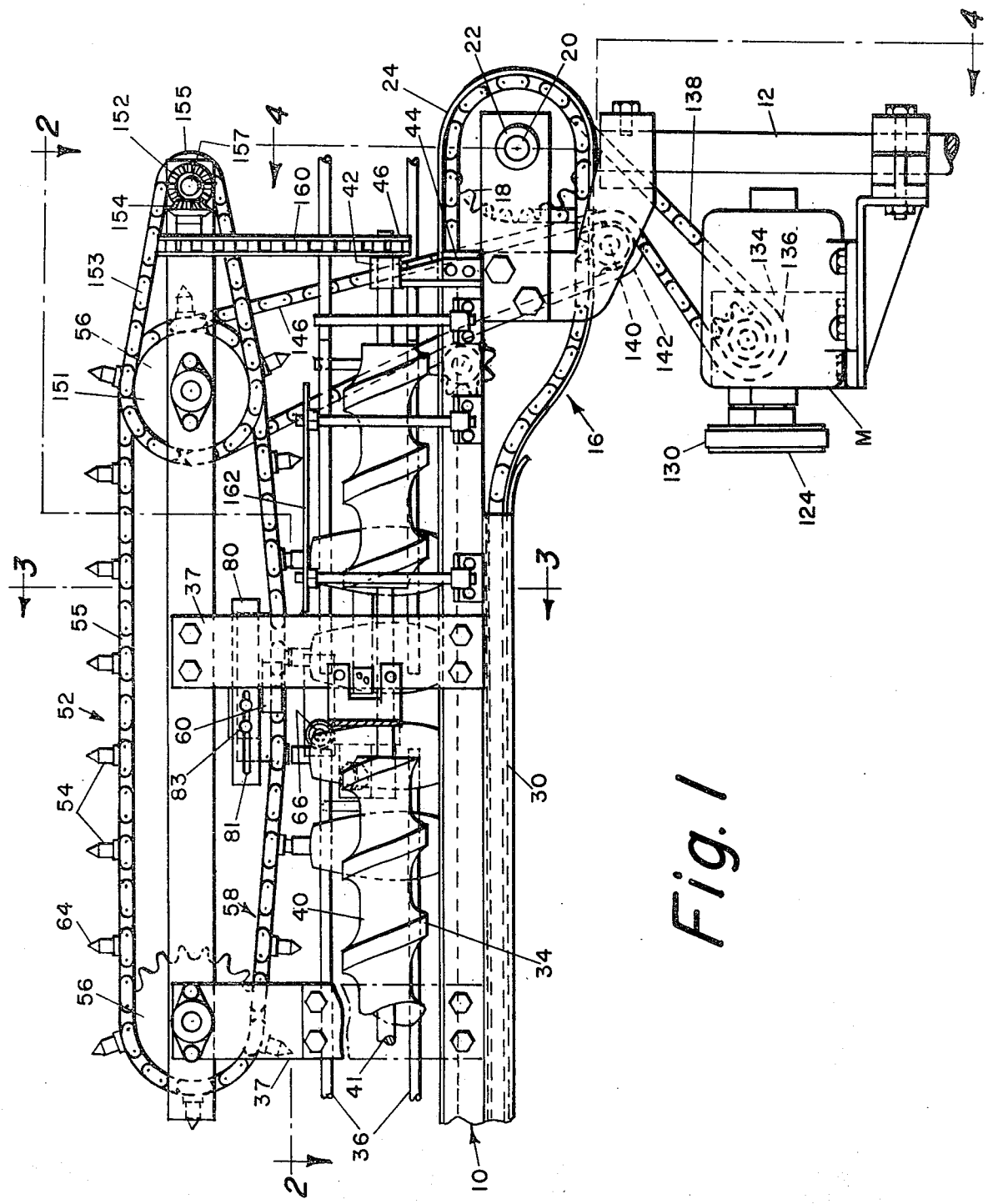
FIG. 1 is an elevation of the apparatus.

The guide rails 32 and the screw 34 contain gaps intermediate their ends which provide an open space 50 forming a turning zone along which the containers travel free of constraint from the guide rails and from the screw so that it is possible in this region to turn the containers about their vertical axes. To prevent displacement of the containers from the conveyor as they travel along this open space 50 there is provided means 52 for holding the containers on the conveyor while permitting them to be rotated about their vertical axes, at a spacing corresponding to that of the pitch of the screw comprising an endless chain 55 on which there are mounted at the spacing of the pitch of the screw pivot pins 54. The chain 55 is mounted above the conveyor 16 on longitudinally spaced sprockets 56—56 with its lower run 58 above the level of the tops of the containers traveling along on the conveyor 16 so that as the pivot pins are carried around by the chain 55 to the lower sides of the sprockets 56 the pivot pins will enter the necks of the containers before the containers reach the open space and be removed from the necks of the containers after they leave the open space. To provide for smooth introduction of the pivot pins into the necks of the containers the lower run of the chain is guided in a gradually downwardly inclined direction from the sprocket 56 at the left hand side as shown in FIG. 1 to a substantially horizontal position midway between the sprockets and then guided upwardly along an incline toward the other sprocket 56. For guiding the lower run of the chain along the horizontal portion there is provided a block 60 having a flat lower surface engaged with the upper side of the lower run. The pivot pins 54 have conical ends 64 to facilitate entry into the open ends of the necks of the containers. It is to be understood, however, that instead of pivot pins socket members may be employed which will telescopically engage the necks of the containers to provide a pivot axis for rotation. The conveyor 52 and pivot pins 54 apply downward pressure to the containers to hold them firmly seated on the conveyor 16 so that they move forwardly at their predetermined spacing without slipping during their forward movement and during their rotation. At the open space 50 the containers are rotated about their vertical axes as shown in FIG. 5. Initiation of their rotation is effected by a ram 66 which is supported for movement at right angles to the path of travel of the containers, transversely of the conveyor 16, its movement being controlled as will appear hereinafter, to engage a container at that side rearwardly of its axis of rotation as the container moves by it to rotate the container about its vertical axis to a transversely disposed position in which the forward end of the container is disposed in a position so as to be intercepted by the guide rails 32 at the one end of the open space. As the containers continue to be moved by the conveyor relative to these guide rails the forwardly displaced end is rotated to a position rearwardly of the axis of rotation which disposes the trailing end of the container forwardly of the axis of rotation. Opposite the guide rails 32 there is a deflector plate 68 supported by upright 37 in a horizontal position with one end 72 spaced from the center line of the conveyor 16, a distance which is slightly greater than one-half the long dimension of the container, and the other end 74 at a distance which is no greater than half the short dimension of the container which provides an inclined surface 76 which by engagement with the rear side of the trailing end rotates the container about its axis so as to bring said trailing end into a leading position in alignment with the center line of the conveyor whereupon it is moved forwardly between the guide rails 32 and the screw. The guide rails are located at a distance from the center line of the conveyor which corresponds substantially to one-half the short dimension of the container.

The containers may have indicia on only one side or on both sides but different on the two sides. When indicia is employed only on one side a definitive mark is provided on that side or on the other side which will initiate operation of the ram 66 to commence the turning operation, either to turn the side which has the indicia on it to the opposite side or the side that does not have indicia on it to the opposite side.

As herein illustrated the ram 66 protrudes from an air operated cylinder 78 mounted by means of bracket 80 to one side of the frame on an upright 37 at that side in a horizontal position near the upper end of a container resting on the conveyor in a position in the space 50 so as to engage the container rearwardly of its axis of rotation after it enters the space. The bracket 80 contains a longitudinal slot 81 and is attached to the upright 37 by bolts 83 so that it may be adjusted along the conveyor 16 to the most effective position for turning the containers. The ram is shown at the level of the shoulder of the container, however, it is to be understood that for different containers the level of the ram may be different. The cylinder 78 is supplied with pressure to extend and retract the ram 66 in timed relation with the arrival of the containers at the position of the ram.

Control is achieved by means of a sensing device 85 in the form of a photoelectric scanner 87 mounted adjacent the conveyor preceding the open space which by observation of a passing container actuates a normally closed three way solenoid operated valve 89 connected by a conductor 91 and conductor 93 to a source of air pressure. Opening of the normally closed valve 89 supplies pressure to an air cylinder 95 from which extends a rod 97 into engagement with a lever 99 extending from a normally closed valve 101. Shifting of the lever 99 opens the normally closed valve 101 to supply air from the line 93 to a normally closed three way valve 103. A lever 105 is provided on the vlave 103 and has on it a follower 107 supported in engagement with the screw shaft 41 intermediate the ends of the screw at the gap in the screw. The screw shaft 41 has on it a protrusion 109 which by engagement with the follower 107 each time it rotates opens and closes the valve 103. If at the time the valve 103 is opened by the screw the lever 99 has been displaced in a direction to open the valve 101, pressure will be supplied from the valve 103 through a conductor 111 directly to the cylinder 78 to effect projection of the ram 66.

Figure 2:
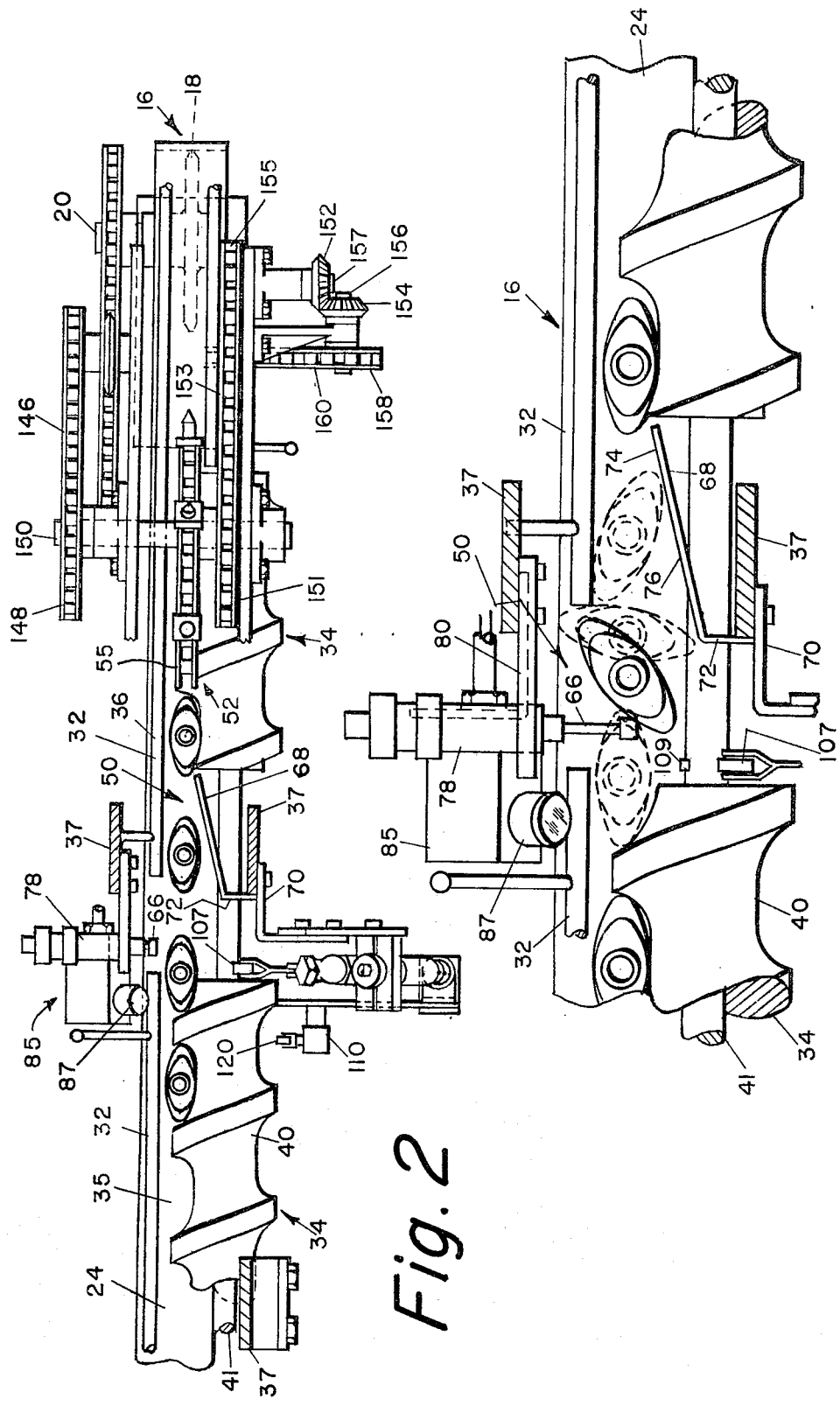
FIG. 2 is a top view taken on the line 2, 2 of FIG. 1.

Since the valve 103 is opened momentarily the pressure through the line 111 will be immediately cut off and the ram 66 returned by spring pressure within the cylinder 78. It is necessary to reset the lever 99 after each operation and so there is provided a three way valve 110 which is connected at one end by a conductor 112 to the conductor 93 and hence to the source and at its other end by a conductor 114 to an air piston 116. A lever 119 provided with a follower 120 is supported in a position to be actuated by engagement of the thread of the screw 34 each time it makes one complete turn to open the valve 110 to supply pressure to the cylinder 116 which projects the piston 118 against the lever 99 so as to close the valve 101. The cylinders and valves are mounted by suitable brackets, FIGS. 2 and 3, to the upright 37 at that side of the apparatus.

The drive for the conveyor is provided for by a motor M, FIGS. 1 and 4, mounted on the base 14 which has on it a drive pulley 124. The drive pulley 124 drives a pulley 126 mounted by means of a shaft 128 on one of the supports 12 by way of a belt 130 entrained at its ends about the respective pulleys. The shaft 128 through a gear reducer 134 drives a sprocket 136. A chain 138 entrained at one end about the sprocket 136 and at its other end about a sprocket 137 fixed to the shaft 20 drives the sprocket 18 at that end of the apparatus and hence the conveyor 16. A sprocket 142 is mounted on a shaft 140 at the underside of the beam so as to be engaged by one run of the chain 138 and to be driven thereby. Rotation of the sprocket 142 effects rotation of the shaft 140 and in turn a sprocket 144 mounted thereon. A chain 146 entrained at one end about the sprocket 144 and a sprocket 148 drives a shaft 150 on which is mounted one of the sprockets 56 so as to drive the conveyor 52. The shaft 150 also has fixed to it a sprocket 151 about which is entrained one end of a chain 153. The other end of the chain is entrained about a sprocket 155 fixed to a shaft 157. A beveled gear 152 is fixed to the shaft 157 and meshes with a beveled gear 154 fixed to a shaft 156. A sprocket 158 fastened to the shaft 156 is connected by a chain 160 entrained at one end about it and at its other end about the sprocket 46 and provides for driving the screw.

To prevent the containers from being lifted off the conveyor 16 as the pivot pins 54 are disengaged from their upper ends there is provided at the far side of the space 50 a pair of stripper plates 162—162 which are supported in a horizontal position just above the shoulders of the containers at opposite sides of the neck with a space therebetween to permit the necks to pass along between them which hold the containers down on the conveyor until the pivot pins are disengaged.

The apparatus as thus constructed enables loading containers onto the conveyor 16 without regard to their orientation and delivering them from the other end in single file with corresponding indicia on one or both sides of the containers facing in the same direction.

It should be understood that the present disclosure is for the purpose of illustration only and includes all modifications or improvements which fall within the scope of the appended claims.

I claim:

1. Apparatus for rotating containers traveling along a predetermined path standing upright thereon about their vertical axes to reverse their facing, comprising means for moving the containers along a predetermined path, means at one side of the path movable into engagement with the end of the container rearwardly of its axis with respect to the direction of movement for rotating the container angularly about its axis to displace said one end to the other side of said path and correspondingly to displace the opposite end of the container angularly about said axis to the one side of said path, means at the one side of said path arranged to intercept the forwardly facing side of the angularly displaced opposite end as the container travels forwardly to displace it angularly about said axis to a position rearwardly of said axis at said one side and correspondingly to displace the said one end angularly about said axis to a position forwardly of said axis at said other side and means at said other side of the path arranged to intercept the rearwardly facing side of said angularly displaced one end as the container travels forwardly to displace it angularly about said axis to a position such that both ends are aligned with said path.

2. Apparatus for rotating containers traveling along a predetermined path standing upright thereon about their vertical axis, to reverse their facing, said containers having opposed sides which are symmettrical with respect to their vertical axes, comprising means for moving the containers in single file with their opposed sides parallel to the direction of movement of the containers along said path, means situated in said path at one side movable into engagement with the end of the container at that side of the path rearwardly of said axis operable to displace the container angularly about said axis toward the other side of the path so that the opposite end of the container forwardly of said axis is displaced angularly about said axis to the one side of said path, fixed means at said one side of said path situated in the path of movement of the container to intercept the forwardly facing side of said angularly disposed opposite end of the container as it travels forwardly to displace said opposite end angularly about said axis to a position rearwardly of said axis at said one side and correspondingly to displace said one end angularly about said axis to a position forwardly of said axis at said other side and means situated at the other side of said path in the path of movement of the container having an inclined part arranged to intercept the rearwardly facing side of said angularly disposed one end as the container travels forwardly to displace it angularly about said axis to a position such that both ends are parallel to said path of movement.

3. Apparatus for rotating containers traveling along a predetermined path standing upright thereon about their vertical axes to reverse their facing, said containers having opposed sides symmetrical with respect to their vertical axes, comprising means for moving the containers along said path with their opposed sides parallel to said path, an endless conveyor with pins mounted thereon at intervals corresponding to the intervals between the containers for engagement with the upper ends of the containers to hold them upright during rotation about their vertical axes and means for effecting rotation of the containers while engaged with said pins, to reverse their positions, comprising means at one side of the path of travel operable by engagement with the trailing sides of the forwardly moving containers with respect to the direction of travel to turn the containers about their vertical axes so as to displace the trailing ends toward the opposite side and the leading ends toward the one side, means at the one side to intercept the leading sides and displace them in a direction rearwardly with respect to the axes of rotation and simultaneously the trailing sides forwardly of the axes of rotation and means at the other side arranged to intercept the trailing sides and displace them forwardly in the direction of travel, the latter means converging toward the longitudinal centerline of the path of travel so as to turn the containers to positions wherein their opposed sides are parallel to said centerline.

4. Apparatus according to claim 3 wherein said pivot means is moved into a position of engagement with the tops of the containers prior to angular rotation thereof and moved out of engagement with the tops of the containers following angular rotation thereof.

5. Apparatus according to claim 3, wherein said pivot means is telescopically engaged with the tops of the containers.

6. Apparatus according to claim 3, wherein said pivot means engages within the open tops of the containers.

7. Apparatus according to claim 3, wherein there are a plurality of pivot means and means for moving successive pivot means into engagement with the tops of the containers as they travel toward the place of turning and removing them from the tops of the containers as they leave the place of turning.

8. Apparatus according to claim 3, wherein said means are arranged successively in the direction of movement of the containers.

9. Apparatus for rotating containers traveling along a predetermined path standing upright thereon about their vertical axes to reverse their facing, said containers having opposed sides symmetrical with respect to their vertical axes, comprising means for moving the containers along said predetermined path with their opposed sides parallel to said path, an orienting zone in which there are means arranged successively along the path of movement for engagement with the sides of the containers intermediate the bottoms and tops for successively turning the containers from a position in which two of their opposed sides are parallel to the direction of movement through 180° of rotation about thheir vertical axes in which the same two opposed sides are parallel to the direction of movement but in reverse, a spacer defining one side of the path along which the containers are guided operable to space the containers a predetermined distance apart, said spacer containing a gap in the zone of orientation which permits the containers to be turned about their vertical axes and hold down means above the path of movement, comprising an endless conveyor, pins mounted on the conveyor at intervals corresponding to the spacing of the containers by the spacer and means for driving the the endless chain in consonance with the spacing of the containers established by the spacer, said endless conveyor being arranged to successively move into, along and out of the gap so as to have engagement with the containers only while traveling along the gap.

10. Apparatus according to claim 9, wherein there is means for holding a predetermined portion of said run at the level of the tops of the containers with the pivot pins engaged within the tops of the containers during the interval of turning of the containers.

11. Apparatus according to claim 9, comprising spaced parallel hold down means at the downstream side of the gap for engaging the tops of the containers in the region where the pins are removed from the tops.

12. Apparatus for rotating containers traveling along a predetermined path standing upright thereon about their vertical axis comprising a conveyor having a horizontal run for receiving the containers, means associated with the horizontal run for confining the containers for movement in single file and at a predetermined spacing, said means containing an open space within which the containers are released from such confinement for rotation about their vertical axes, means arranged to be pivotally engaged with the tops of the containers as they are moved into said open space at one end and to be withdrawn from said containers as they are moved out of said open space to constrain the containers while moving along said open space to pivotal movement about their vertical axes, means at one end of said open space at one side movable towards the other side into engagement with the end of the container rearwardly of said axis of rotation to displace the container about said axis toward the other side so that the opposite end of the container forwardly of the axis is displaced angularly about said axis to the one side of the path, means at the other end of said open space constituted by part of the confining means to intercept the forwardly facing side of said opposite end of the container as the container travels forwardly to displace said opposite end of the container angularly about said axis to a position rearwardly of said axis at said one side and correspondingly to displace the one end angularly about said axis to a position forwardly of said axis at said other side and means at said other side inclined toward said one side for receiving and guiding the rearwardly facing side of said one end angularly about said axis to dispose said one end into alignment with the confining means.

13. Apparatus for rotating containers traveling along a predetermined path standing upright thereon about their vertical axes, comprising a conveyor having a horizontal run on which the containers stand upright, a rail along one side of the conveyor and a spacer along the other side deefining a path which confines the containers with their longer dimensions parallel to the direction of movement and their shorter dimensions transverse thereto for movement in single file, said rail and spacer containing gaps which provide an unobstructed opening space along which the containers are free to be rotated about their vertical axes, means movable in consonance with the conveyor in engagement with the tops of the containers before they reach the gaps and out of engagement with the containers after they leave the gaps to retain the containers on the conveyor during rotation about their vertical axes, a ram situated at the gap movable transversely of the path of movement operable by engagement with an end of the container to turn it about its vertical axis to a position such that the long side is diagonal to the path of movement, and guides extending along the path of movement at opposite sides of the centerline thereof one of which is parallel thereto and spaced therefrom a distance one-half the short dimension and the other of which is at a distance which converges with respect to the centerline of the path of travel from a distance which is greater than one-half the short dimension to a distance which corresponds to one-half the short dimension.

14. Apparatus according to claim 13, wherein the ram is arranged to rotate the container to said diagonal position to dispose the leading end of the container in a position to be intercepted by the parallel one of the guides.

15. Apparatus according to claim 13, wherein the spacer is a screw.

16. Apparatus for rotating containers traveling along a predetermined path standing upright thereon about their vertical axes comprising a conveyor for moving containers standing upright thereon along a predetermined path, means arranged to be engaged with the tops of the containers at a predetermined region to hold the containers on the conveyor while permitting them to be rotated about their vertical axes and means at said region for effecting rotation of the containers, comprising a ram supported at one side for movement into engagement with one end of the container, at that side rearwardly of said axis to displace the container angularly about said axis in a direction to move the other end of the container, forwardly of said axis, to a position transversely of the path of movement, a guide rail at that side parallel to the direction of movement arranged to intercept the transversely disposed other end to displace it rearwardly about said axis and simultaneously to move said one end forwardly of said axis and a deflector rail at said other side of said path for engaging and turning the rearwardly facing side of said one end forwardly into alignment with the path of travel.

17. Apparatus for rotating containers traveling along a predetermined path standing upright thereon about their vertical axes, comprising a conveyor having a horizontal run on which the containers stand, a rail along one side of the conveyor and a spacer along the other side defining a path which confines the containers with their longer dimensions parallel with the direction of movement and their shorter dimensions transverse thereto for movement in single file, said rail and spacer containing gaps providing an unobstructed open space along which the containers are free to rotate about their vertical axes, means movable in consonance with the conveyor into engagement with the tops of the containers before they reach the gap and out of engagement with the tops after the leave the gap to retain the containers on the conveyor during rotation about their vertical axes and a reciprocable member supported at the open space for movement transversely of the path of movement operable to displace the leading end of the container about said axis to a position such that the leading end is intercepted by the rail at the one side of the open space and the trailing end is displaced forwardly about said axis, transversely spaced stationary members extending along the path of movement at opposite sides of the path of travel having surfaces which are respectively parallel to the path of travel and at a distance therefrom which is less than half the long dimension and convergent thereto from a distance which is greater than one-half the long dimension to a distance which corresponds to one-half the short dimension.

18. Apparatus according to claim 17, wherein the spacer is a screw, the screw operating to deliver the containers at equal spacings to the gap for rotation and the guide members deliver the containers following rotation back to the screw.

19. Apparatus according to claim 13, wherein the ram is adjustable longitudinally of said open space in the direction of the path of travel.

20. Apparatus according to claim 13, wherein a detector is situated adjacent said path in a position preceding the open space responsive to indicia on the containers traveling along said path to initiate operation of the ram for reversal of only the containers bearing said indicia.

21. Apparatus for orienting containers bearing distinctly different indicia on opposite sides to rearrange the containers in line with corresponding indicia on one side, comprising a conveyor for receiving the containers standing upright for movement along a predetermined path, means arranged along said path for guiding the containers along said path with the indicia bearing sides parallel to said path, said means containing a gap, means coextensive with the gap for movement into engagement with the tops of the containers, said means traveling in consonance with the conveyor and operating to hold the containers on the conveyor while permitting rotation about their vertical axes, a ram at one side of the conveyor movable transversely from the path of movement of the containers, which rotates the containers from a position in alignment with said path to a position transverse of said path, a stationary abutment at said one side situated at a distance from the centerline of said path of movement which is less than half the long axis of the container which further rotates the containers in the same direction to reverse their traversity, and a stationary guide at said other side with one end situated at a distance greater than one-half the long axis and the other end at a distance corresponding to one-half the short axis which still further rotates the containers in the same direction into alighment with said path.

22. Apparatus for orienting containers of different overall width in one direction form that at right angles thereto so as to have the sides and ends with the shorter dimensions between the sides and the longer dimensions between the ends, and wherein there are distinctively different indicia on the opposite sides, a first conveyor provided with a horizontal run for movement of the containers standing upright thereon along a predetermined path, means along the opposite sides of the conveyor for guiding the containers in a single file with the label bearing sides parallel to the path of movement, said means containing a gap, a second conveyor supported above the first conveyor for movement in consonance therewith, pivot means mounted on the second conveyor at a spacing corresponding to the spacing of the containers on the first conveyor movable into engagement with the tops of the containers as they travel along toward the gap and out of engagement with thhe tops after they leave the gaps, said pins operating to hold the containers on thhe first conveyor as they travel along the gap while permitting them to be rotated about their vertical axes and means at the gap responsive to the indicia at one side only for effecting rotation of the containers to reverse their positions on the first conveyor, said means comprising an air operated ram, sensing means responsive to said indicia to project the ram across the first conveyor and guides extending along the path of movement at opposite sides thereof one of which is parallel thereto and spaced therefrom a distance of one-half the short dimension of the container and the other of which converges with respect to the centerline from a distance which is greater than one-half the short dimension to a distance which corresponds to one-half the short dimension.

23. Apparatus according to claim 17, comprising means supporting the sensing means for adjustment along the gap.

24. Apparatus for orienting containers of different overall widths in one direction than that at right angles thereto, so as to have sides and ends with the shorter dimensions between the sides and the longer dimensions between the ends and wherein there are distinctively different indicia on the opposite sides, a first conveyor provided with a horizontal run for movement of the containers standing upright thereon along a predetermined path, means along the opposite sides of the conveyor for guiding the containers in single file with the label bearing sides parallel to the path of movement, said means containing a gap, a second conveyor supported above the first conveyor for movement in consonance therewith, pivot pins mounted on the second conveyor at a spacing corresponding to the spacing of the containers on the first conveyor movable into engagement with the tops of the containers as they travel toward the gap and out of engagement with the tops of the containers as they leave the gap said pins operating to hold the containers on the first conveyor as they travel along the gap while permitting them to be rotated about their vertical axes and means at the gap for rotating the containers comprising a reciprocal ram arranged at the gap for rotating the containers to dispose their long axes at an angle to the conveyor, sensing means at one side for initiating operation of said ram wehn a container bearing predetermined indicia at that side arrives at the gap to displace the ends of the containers transversely of the path, a fixed abutment situated closer to the center line of the first conveyor than one half the long dimension of the container for intercepting the forwardly facing side of the forward one of the ends to further rotate the container to displace the rear one of the ends forwardly of said axis of rotation at a lesser distance than said one half the long dimension and an inclined guide at the other side one end of which is situated at a distance greater than one half the long dimension and the other end at a distance corresponding to one half the short dimension for further rotating tthe forwardly disposed rear one of said ends to align said end with the path of movement.

25. Apparatus according to claim 16, comprising means for driving the container conveyor, the screw, and the pivot pin conveyor in synchronism.

26. Apparatus according to claim 16, comprising an air cylinder for projecting the ram, and means for supplying air to the air cylinder as each container is moved into position for turning comprising normally closed valve means connected to a source of pressure and to the ram cylinder and a sensor responsive to the passage of a container to open said normally closed valve means.

27. Apparatus according to claim 26, wherein the sensor supplies pressure to an air cylinder which in turn opens said normally closed valve means.

28. Apparatus according to claim 26, wherein there is a cam operated normally closed valve operable for each rotation of the screw to supply air to an air operated piston which returns the valve means to its normally closed position.

29. Apparatus according to claim 26, wherein said valve means includes a normally closed valve which is opened each time the screw shaft rotates to connect the valve means to said air cylinder.

* * * * *